United States Patent Office 3,618,487
Patented Nov. 9, 1971

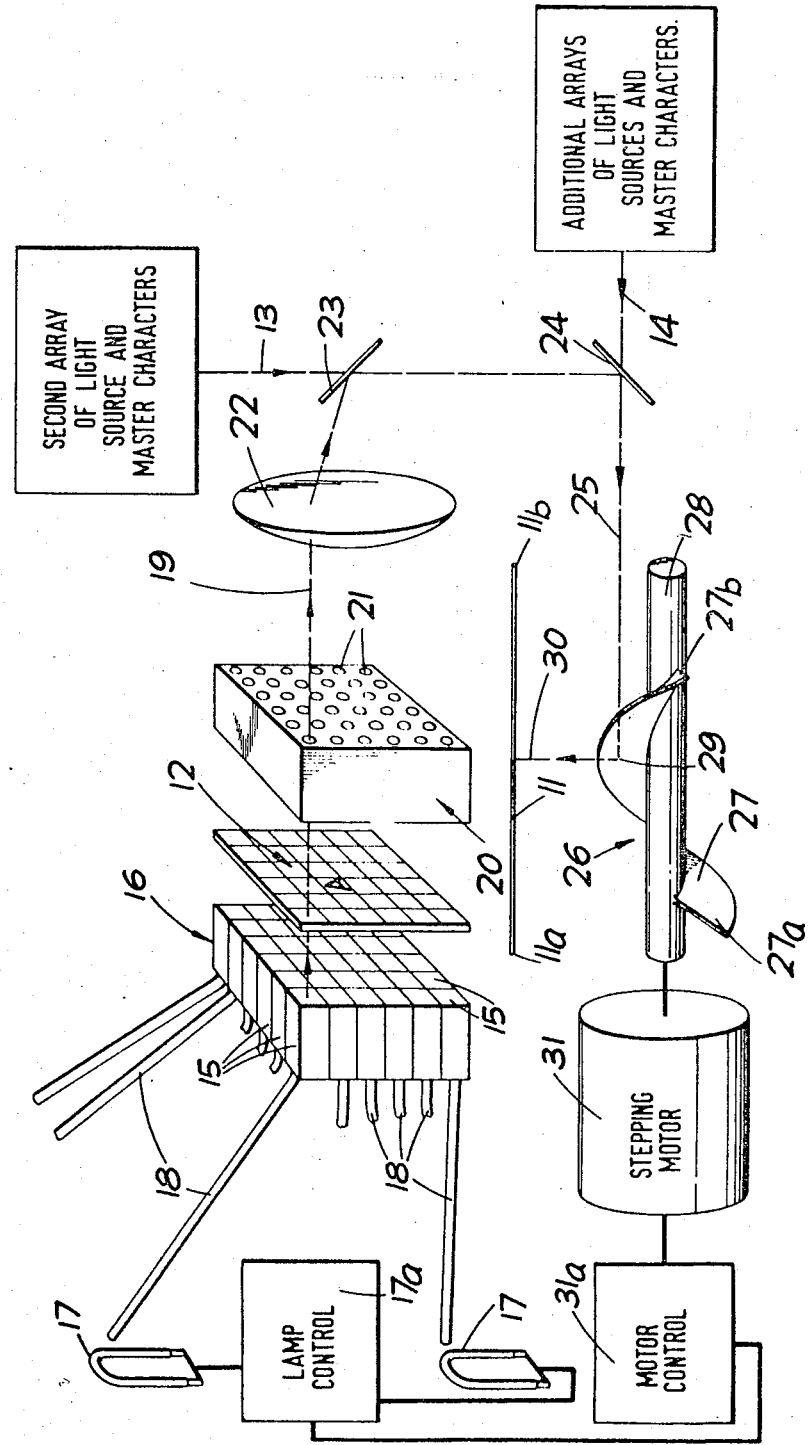

3,618,487
PHOTOCOMPOSING APPARATUS
Josef Maria Herbert Tiefenthal, Reigate, Surrey, and Howard Raymond Baylis, East Grinstead, Sussex, England, assignors to The Monotype Corporation Limited, London, England
Filed June 24, 1969, Ser. No. 835,958
Claims priority, application Great Britain, July 1, 1968, 31,252/68
Int. Cl. B41b 21/26
U.S. Cl. 95—4.5   5 Claims

ABSTRACT OF THE DISCLOSURE

In the photocomposition of print characters a succession of print characters are projected optically on to a film using a helical reflecting surface which is rotated so that the reflected path moves progressively across the film. A plurality of lights selectively illuminate the required characters at the right instants as the reflected path moves across the film.

---

The invention relates to photocomposing apparatus in which images of a succession of print characters are projected on to a light sensitive member to build up a line, or lines, of print. In this specification the term "light" includes visible radiation and radiation outside the normal visible range which may be used to project character images and be recorded on means sensitive to the radiation.

The invention provides photocomposing apparatus for composing print which apparatus comprises means for projecting images of a succession of print characters, reflecting means including a rotary body member and a reflecting surface arranged to receive light projected along an optical path parallel to the axis of rotation and reflect the light on to a light sensitive recording member to build up a line of print, which reflecting surface is arranged to extend around, and axially along, the body member in such a way that when the body member is rotated the position at which the optical path is incident on the reflecting surface moves axially along the reflecting means, and means for rotating the reflecting means about the said axis of rotation so that the path of the reflected light is moved in a direction along the axis of rotation to space successive character images along a line on the light sensitive recording member.

Preferably the reflecting surface extends around the body member in substantially helical form.

Preferably the reflecting means comprises a cylindrical screw device at least part of the surface of which provides a reflecting surface. Preferably the helical reflecting surface extends around one complete turn so that at the end of each complete revolution of the reflecting means the path of the reflected light returns to the beginning of the line on the recording member.

Preferably a motor is provided to rotate the reflecting means and means is provided for indicating the rotational position of the reflecting means at any time. The motor may be a stepping motor arranged to be driven in response to a series of electrical pulses and means may be provided to count the pulses fed to the stepping motor thereby to give an indication of the rotational position of the reflecting means.

The means for projecting images of a succession of print characters may include an array of master characters and a plurality of light sources each associated with a respective master character on the array so that the required character may be selected by operating the appropriate light source.

Preferably means is provided to control the operation of the light sources in dependence on the rotational position of the reflecting means so that in operation the next required light source may be operated when the reflecting means has been rotated the correct amount to provide the required spacing along the line on the recording member between the last character exposed and next character to be exposed.

Preferably a light transmitting rod extends between each light source and a position adjacent its associated master character so that when any light source is operated, light passes only to the associated one master character.

Preferably a plurality of separate arrays of master characters is provided, each array having its own light sources, and means is provided for directing the optical path from each array along a common path to the reflecting means.

A specific example of photocomposing apparatus embodying the invention will now be described by way of example and with reference to the accompanying drawing which shows diagrammatically part of a photocomposing apparatus.

In this example a plurality of master characters (showing alphabetical or numerical characters) are arranged so that the images of a succession of selected master characters may be optically projected on to a light sensitive member, in the form of a photographic film 11, to build up lines of print on the film 11 with the required spacing between adjacent characters in each line.

The master characters, which may be transparent characters on an opaque surround, are mounted in eight separate arrays each array bearing thirty six characters. Only one array 12 is shown in the drawing although optical paths 13 and 14 from a second and the other arrays are shown. Furthermore, for simplicity, only one character A is shown on the array 12. The optical arrangement for each array is similar and will be described with reference to the array 12 only. The array 12 is fixed in position and is rectangular with the characters arranged in horizontal and vertical rows. A separate light source 17, such as a Xenon flash tube, is provided for each master character in the array and the light is directed from each source to its associated character by a light transmitting rod 18 similar to those used in fibre optics. For convenience, only some of the sources 17 and rods 18 are shown. The ends of the rods 18 are formed as rectangular blocks 15 mounted together as a rectangular block 16 of similar shape and size to the array 12 so that each block 15 lies behind one associated master character on the array 12. The light sources 17 may be selectively operated to illuminate any required master character and the rods 18 tend to ensure that the light from any one source 17 illuminates only the one master character associated with the light source operated.

Light transmitted by any of the master characters on the array 12 passes along a path 19 to a lens array 20. This includes thirty six separate lenses 21 each aligned with a respective master character in the array 12 and offset to direct the light transmitted through a collimator lens 22 to a semi-silvered mirror 23. The mirror 23 reflects light from the first array 12 (and transmits light which comes along the path 13 from the second array not shown) on to a further semi-silvered mirror 24. The mirror 24 reflects light from the mirror 23 (and transmits light which comes along the path 14 from the third to eighth arrays not shown) so that light from all of the arrays is directed along a common path 25 towards a reflecting device 26. The optical system for the various arrays of master characters is such that no correcting movement of the mirrors 23 and 24 is needed to compensate for variation in the length of path from the separate arrays to the reflecting device 26.

The reflecting device 26 comprises a helical polished reflecting surface 27 mounted on rotatable shaft 28 to form a cylindrical Archimedean screw. The surface 27 slopes at 45° to the axis of the shaft 28 (which is parallel to the optical path 25) so that light incident on the surface 27 at the point 29 is reflected through 90° along a path 30 on to a light sensitive film 11. The film 11 forms a recording member for the composed print and may be mounted on a drum rotatable about an axis parallel to the shaft 28 so that the film 11 may be moved on from one line to the next.

The shaft 28 is coupled to a stepping motor 31 (which may be of the type described in our co-pending United States application Ser. No. 620,881) arranged to be driven at a constant speed by a steady stream of electric pulses from a motor control unit 31a. This causes the helical surface 27 to rotate and consequently the point 29 at which the optical path 25 is incident on the surface 27 moves progressively along the surface 27 from one end 27a to the other end 27b. This causes the path 30 to move sideways along the film 11 from the end 11a to the end 11b. In this way the images of successive master characters may be spaced out along a line along the film 11.

The surface 27 extends around substantially one turn so that when the point 29 reaches the end 27b of the surface 27, further rotation of the shaft 28 causes the point 29 to revert to the other end 27a of the surface 27. In this way, after a full revolution of the shaft 28, composition of the next line of print can start after the last character of the preceding line (providing the drum on which the film 11 is mounted is moved on to the next line position) thereby avoiding any "carriage return" delay in the reflecting device 26.

The steady flow of electric pulses to the stepping motor 31 is counted electronically by a counter in the motor control unit 31a which thereby provides an indication of the angular position of the reflecting device 26 and consequently the position of the optical path 30 along the line on the film 11.

The light sources 17 are controlled by a lamp control device 17a responsive to the number of pulses fed to the stepping motor 31 so that allowing for the width of character to be projected and justification requirements, the selected light source 17 is flashed at the right instant so that the selected character is exposed to the film 11 in the correct position along the line on the film 11.

The selection and spacing of the characters is determined by signals from a record member, such as punched tape (or magnetic tape) prepared on a keyboard operated machine. The signals are put on the tape in code form and represented by the position of the holes across the tape strip.

It will be seen that the apparatus described above avoids certain delays in the composition of print. The characters may be selected and exposed at speeds in the range of 1,000 to 10,000 characters per second. The flash duration time for the light sources 17 may be 1/200,000 second.

The invention is not restricted to the details of the foregoing example. For instance, a stepping motor need not be used. Other electric motors or drive mechanisms may be used with some suitable means for indicating the position of the path 30 along the line on the film 11 so that the light sources 17 can be operated at the correct moments.

The reflecting surface 27 need not necessarily be of smooth helical form but could be provided by a large number of small flat reflecting surfaces arranged as facets on a generally helical surface. This avoids distortion of the image reflected by the surface 27 as the images are always reflected by a single flat surface. When a smooth helical surface is used, such as the surface 27 shown in the drawing, image distortion may be reduced by increasing the diameter of the device 26 and by reducing the length of the path 30 from the surface 27 to the film 11. Image distortion when using a smooth helical reflecting surface can be avoided by pre-distorting the image by optical means before the light is incident on the surface 27, or by using distorted character shapes in the master characters, so as to compensate for distortion by the surface 27.

The arrangement of arrays of master characters need not necessarily be as shown in the drawing. The path 13 may lead from further arrays (such as a 4th, 6th and 8th array), in addition to the second array, the light from the arrays being directed to the semi-silvered mirror 23 by further semi-silvered mirrors (not shown). Similarly the path 14 may lead from further arrays, such as a 5th and 7th array, via a further semi-silvered mirror (not shown).

The rods 18 may be of perspex or may be optical fibres and the rods 18 may be of square section throughout their length.

We claim:

1. Photocomposing apparatus for composing print, comprising: an array of master characters; optical projection means for projecting images of a succession of print characters, said optical projection means including a plurality of selectable light sources each associated with a respective master character on said array so that the required character may be selected by operating the appropriate light sources; a light sensitive recording member for receiving said images to build up a line of print; a rotary reflecting device for directing the projected images on to sad recording member and spacing successive images along said recording member, said reflecting device comprising a rotary body member and a continuous reflecting surface extending around and axially along said body member in a continuous helix, whereby incident light parallel to the axis of rotation of said rotary body member is reflected along a path which moves along said axis of rotation upon rotation of said rotary member; motor means rotating said reflecting device at a constant speed; means for indicating the rotational position of said reflecting device at any given time; and means operably associated with said indicating means for controlling the operation of said selectable light sources in dependence on the rotational position of said reflecting device, said last-mentioned means operating a selected one of said light sources when said reflecting device has been rotated a distance sufficient to provide the required spacing along the line on said recording member between the last character exposed and next character to be exposed.

2. Photocomposing apparatus as claimed in claim 1 in which said helix extends around one complete turn so that at the end of each complete revolution of the reflecting device the path of the reflected light returns to the beginning of the line on the recording member.

3. Photocomposing apparatus for composing print, comprising: optical projection means for projecting images of a succession of print characters; a light sensitive recording member for receiving said images to build up a line of print; a rotary reflecting device for directing the projected images on to the recording member and spacing successive images along said recording member, said reflecting device comprising a rotary body member and a continuous reflecting surface extending around and axially along said body member, whereby incident light parallel to the axis of rotation of said body member is reflected along a path which moves along said axis of rotation upon rotation of said rotary body member; a stepping motor for rotating said rotary body member of said reflecting device driven in response to a series of electrical pulses; and means for counting the pulses fed to said stepping motor so as to indicate the rotational position of said reflecting device at any given time.

4. Photocomposing apparatus as claimed in claim 3, wherein said optical projection means includes an array of master characters and a plurality of light sources each associated with a respective master character on said array so that the required character may be selected by operating the appropriate light source, and in which a light transmitting rod extends between each light source and a position adjacent its associated master character so that when any light source is operated, light passes only to the associated one master character.

5. Photocomposing apparatus as claimed in claim 4 in which a plurality of separate arrays of master characters is provided, each array having its own light sources, and means is provided for directing the optical path from each array along a common path to the reflecting device.

References Cited

UNITED STATES PATENTS

| | | | |
|---|---|---|---|
| 1,893,158 | 1/1933 | Chireix | 95—4.5 X |
| 3,183,806 | 5/1965 | O'Brien | 95—4.5 |
| 3,188,929 | 6/1965 | Higonnet | 95—4.5 |
| 3,496,846 | 2/1970 | Clark | 95—4.5 |

JOHN M. HORAN, Primary Examiner